United States Patent
Sasaki et al.

[11] Patent Number: 5,263,009
[45] Date of Patent: Nov. 16, 1993

[54] FOCUS SERVO CIRCUIT FOR A MAGNETO-OPTICAL DISK RECORDING AND REPRODUCING APPARATUS

[75] Inventors: Yoshihiro Sasaki; Toru Sekiguchi, both of Tokyo, Japan

[73] Assignee: NEC Corporation, Tokyo, Japan

[21] Appl. No.: 736,981

[22] Filed: Jul. 29, 1991

[30] Foreign Application Priority Data

Jul. 27, 1990 [JP] Japan .................................. 2-200467

[51] Int. Cl.⁵ .............................................. G11B 7/00
[52] U.S. Cl. .................................................. 369/44.29
[58] Field of Search ............... 369/44.27, 44.29, 44.31, 369/44.35, 44.36; 250/201.5

[56] References Cited

U.S. PATENT DOCUMENTS

| | | |
|---|---|---|
| 4,337,532 | 6/1982 | Oprandi et al. ................. 369/44.29 |
| 4,439,848 | 3/1984 | Ceshkovsky et al. ............. 369/44.29 |
| 4,544,837 | 10/1985 | Tanaka et al. .................... 369/44.29 |
| 4,998,233 | 3/1991 | DiMatteo et al. ................. 369/44.27 |
| 5,060,215 | 10/1991 | Kawamura et al. ............. 369/44.29 |
| 5,103,439 | 4/1992 | Bierhoff et al. .................. 369/44.27 |
| 5,113,384 | 5/1992 | McDonald et al. ............... 369/44.29 |

*Primary Examiner*—Donald E. McElheny, Jr.
*Attorney, Agent, or Firm*—Sughrue, Mion, Zinn, Macpeak & Seas

[57] ABSTRACT

An apparatus for optically recording/reproducing data to/from a disc including a focus servo circuit which initially sets an objective lens of an optical head to a predetermined setting. This predetermined setting is such that a laser beam passing through the lens is focused on the disc at a point inside of the disc in the thickness direction. Then, the focus servo circuit fine tunes the objective lens position until the laser beam is focused onto a recording film located inside of the disc.

5 Claims, 5 Drawing Sheets

FOCUS SERVO CIRCUIT FOR A MAGNETO-OPTICAL DISK RECORDING AND REPRODUCING APPARATUS

BACKGROUND OF THE INVENTION

The present invention relates to a recording and reproducing apparatus of the type using an optical disk such as a magneto-optical disk and, more particularly, to a focus servo circuit incorporated in such an apparatus for focusing a laser beam onto a recording medium surface or a recording film surface of a magneto-optical disk accurately and rapidly without an error.

A recording and reproducing apparatus of the type described records and reproduces information in and out of a magneto-optical disk by striking a laser beam onto the disk. This kind of apparatus has a tracking servo circuit for accurately positioning the laser beam on a desired track of the disk, and a focus servo circuit for focusing the laser beam onto a recording film surface of the disk. The prerequisite with the focus control is that the laser beam be focused onto the surface of the recording film which is positioned 1 millimeter to 2 millimeters deep in the disk as measured from the surface of the disk, and not onto the surface of the disk. Since the surface of the recording film generally has greater reflectivity than that of the disk, the focus servo control is so effected as to focus the laser beam onto the recording film on the basis of such a difference in reflectivity. However, when use is made of a disk having a recording film whose surface is merely a little different in reflectivity from the surface of the disk, the focus servo is apt to focus the laser beam onto the disk surface.

To better understand the present invention, a brief reference will be made to a conventional recording and reproducing apparatus, shown in FIG. 1. As shown, the conventional apparatus has a magneto-optical disk 1, an optical head 2, a laser diode (LD) driver 3, a magnetic field generating unit 4, a radio frequency amplifier (RF AMP) 5 for amplifying a reproduced RF signal, a focus servo circuit 6, and a tracking servo circuit 7. On receiving a data signal, the LD driver 3 modulates a laser beam by the data signal in a predetermined manner to thereby record the data signal in the recording film of the disk.

The head 2 has a laser diode 8, a collimator lens 9, a beam shaping prism 10, polarizing beam splitters 11 and 12, and an objective lens 13. A laser beam issuing from the laser diode 8 is incident to the disk 1. The light from the beam splitter 12 is propagated through a ¼ wavelength plate 14 and a lens 15 to a detector 16 which is assigned to the reproduced signal, whereby the reproduced signal is picked up. The light from the other beam splitter 11 is propagated through a lens 17 and a beam splitter 18 to a detector 19 which is assigned to tracking error detection, whereby a signal for tracking error detection is picked up. The other part of the light from the beam splitter 18 is incident to a detector 21 for focus error detection via a knife edge 20 so as to pick up a signal for focus error detection. The outputs of the tracking servo circuit 7 and focus servo circuit 6 are applied to a lens actuator 22 to control the position of the objective lens 13.

FIG. 2 shows a prior art construction of the focus servo circuit 6. As shown, a signal $S_1$ photoelectrically converted by the detector 21 is transferred to a differential amplifier (DIF. AMP) 24 via an inverting amplifier 23. The differential amplifier 24 produces a difference signal representative of a difference between the amplified signal $S_1$ and a signal $S_2$. An error amplifier (ERR. AMP) 25 performs servo operations such that the error signal from the differential amplifier 25 becomes zero, i.e., such that the input has the ground level. The output of the error amplifier 25 is corrected in phase by a lead-lag filter 26 and then fed to a drive amplifier (DRIVE AMP) 29 via a switch 27 and a mix amplifier (MIX AMP) 28. The drive amplifier 29 effects voltage-to-current conversion to drive a coil which is included in the actuator 22, FIG. 1.

At the beginning of servo pull-in, a CPU 30 opens the switch 27 to open the servo loop (servo OFF) and then delivers data for moving the objective lens 13 to a digital-to-analog converter (D/A CONV.) 31. These data are selected such that the objective lens 13 sequentially approaches the surface of the disk 1 away from a position which is sufficiently spaced apart from the latter. The D/A converter 31 sequentially converts the incoming data to an analog signal to thereby drive the previously mentioned coil via the mix amplifier 28 and drive amplifier 29. On the other hand, a sum amplifier (SUM AMP) 34 produces a sum signal which is representative of the sum of the signals $S_1$ and $S_2$. The sum signal and the previously mentioned difference signal are applied to a sum level comparator 32 and a pull in comparator 33. While the objective lens 13 is in movement, the CPU 30 constantly monitors the outputs of the comparators 32 and 33. As soon as the sum signal and the difference signal exceeds respectively predetermined threshold values Vths and Vthd, the CPU 30 closes the switch 27 to end the servo pull-in operation.

The above-described operation will be described with reference to FIGS. 3(a), 3(b) and 3(c) which show respectively the sum signal of signals $S_1$ and $S_2$, the difference signal, and the position of the lens 13 relative to the disk 1. In FIG. 3(c), $L_S$ is representative of a distance where the focus of the objective lens 13 is coincident with the surface of the disk, while $L_R$ is representative of a distance where the focus of the lens 13 is coincident with the surface of the recording film of the disk. In a magneto-optical disk, the recording film surface is located at a position deeper than the disk surface. FIG. 3(d) indicates the drive current which is produced by the drive amplifier 29, FIG. 2.

First, a current I, FIG. 3(d), which sequentially increases from $I'_p$ is applied to the lens actuator to move the objective lens 13 little by little from a position P' sufficiently spaced apart from the disk surface toward the disk surface. The current I corresponds to the previously mentioned data which is transferred from the CPU 30 to the D/A converter 31. In general, the objective lens 13 is moved in such a manner away from the above-mentioned position. The reason is that the surface of the recording film which generally deviates over a range of about ±100 microns will be surely brought to the focal depth despite that the detectable range of the focus detector of the optical reproducing apparatus is as narrow as about ±20 microns.

Ideally, it is possible that the objective lens may be once brought close to the disk surface and then sequentially moved away from the latter. However, this scheme is generally not used since the lens moved beyond the focusing point might hit against the disk surface.

As the objective lens 13 approaches the disk, the servo error signal (difference signal) and the sum signal change as shown in FIGS. 3(a) and 3(b), respectively. When the sum signal and the difference signal exceed respectively the thresholds values Vths and Vthd, it is determined that the focusing point has entered the pull-in range. As a result, the servo loop is closed.

Assume that the distance between the objective lens and the surface of the disk which faces the lens 13 is generically referred to as L, and that the specific distance at which the light beam is focused onto the disk surface that faces the lens is $L_S$. Then, the distances L and $L_S$ are related as shown in FIG. 3(c). At this instant, the disk 1 and the objective lens 13 are related as shown in FIGS. 4(a) and 4(b). In the figures, the recording film is labeled 1a and positioned deeper than the disk surface.

The conventional method described above has the following problem. Assume that the reflectivity of the disk surface and that of the recording surface are close to each other, as indicated by dashed lines in FIG. 3. Then, since the conventional method allows a condition $L=L_S$ to hold during the focus servo pull-in operation, the sum signals Vss and Vfs and the difference signals Vsd and Vfd appearing at two locations of the recording film surface are close to each other. As a result, the pull-in condition is satisfied when the light beam is focused on the disk surface, closing the servo loop. More specifically when the reflectivity of the surface of the recording film is close to that of the disk surface, it is likely that the servo loop is closed when the light beam is focused on the disk surface. This disturbs the performance of an optical recording/reproducing apparatus in normal recording or reproducing operation.

SUMMARY OF THE INVENTION

It is therefore an object of the present invention to provide an optical recording and reproducing apparatus which prevents a focus servo operation from being locked on the surface of an optical disk even if reflectivity of the surface of a recording film is low and little different from that of the disk surface.

In accordance with the present invention, there is provided an apparatus for recording or reproducing data into or from an optical disk having a recording film therein by emitting a laser beam onto the disk via an objective lens. The device sets up a distance between the end face of the objective lens and the surface of the disk facing the lens, this distance shorter than the distance between the end face of the lens and the surface of the disk facing the lens when the laser beam is focused on the disk surface. The objective lens is then moved from the position so set toward the surface of the recording film. On detecting that the laser beam has been focused on the surface of the recording film, the apparatus starts on a focus servo operation.

The focus servo circuit apparatus having, the above construction prevents the focus servo from being locked on the surface of the disk and effects focus servo pull-in surely and rapidly.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
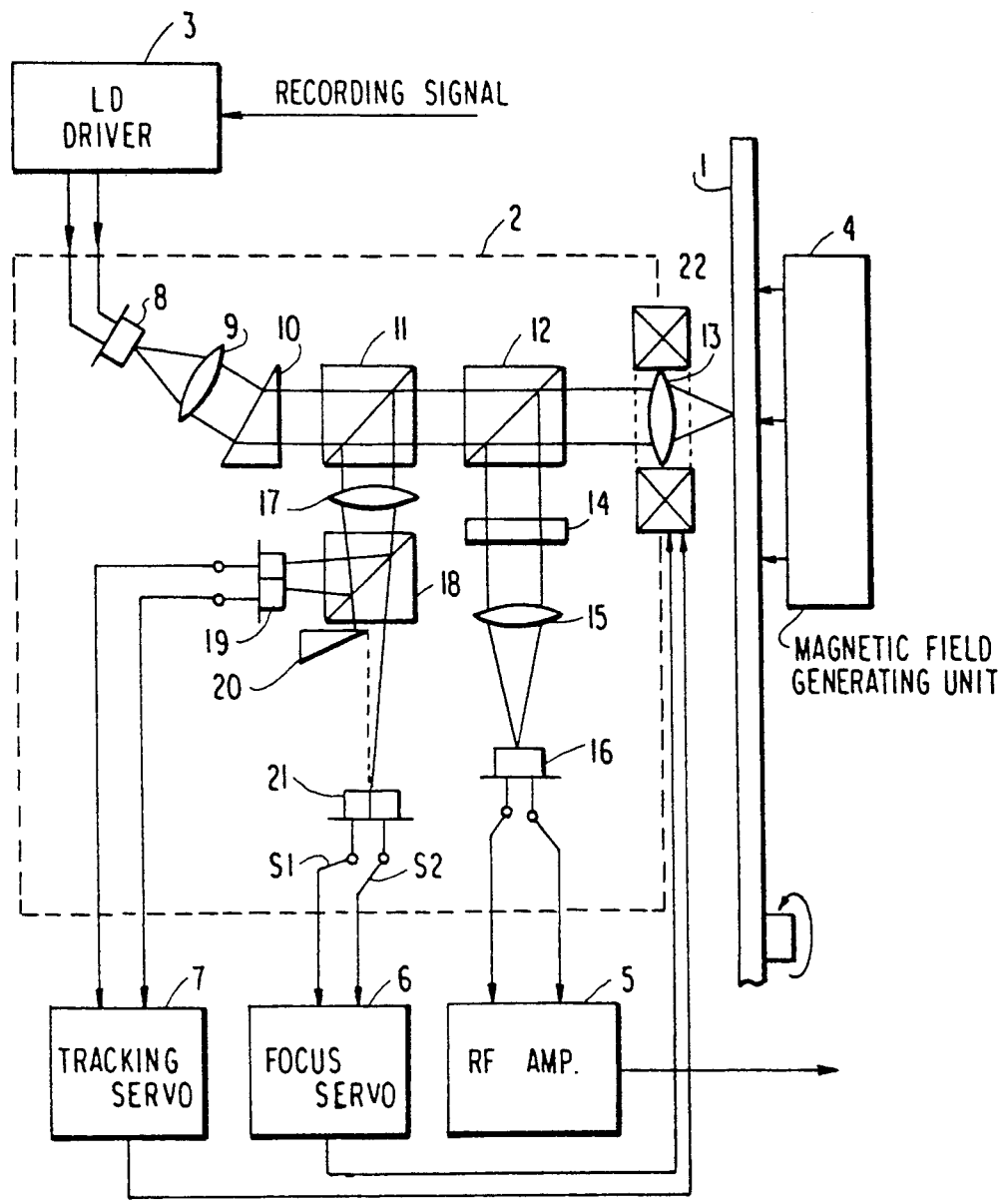
FIG. 1 is a block diagram schematically showing a conventional magneto-optical disk recording and reproducing apparatus.
Figure 2:
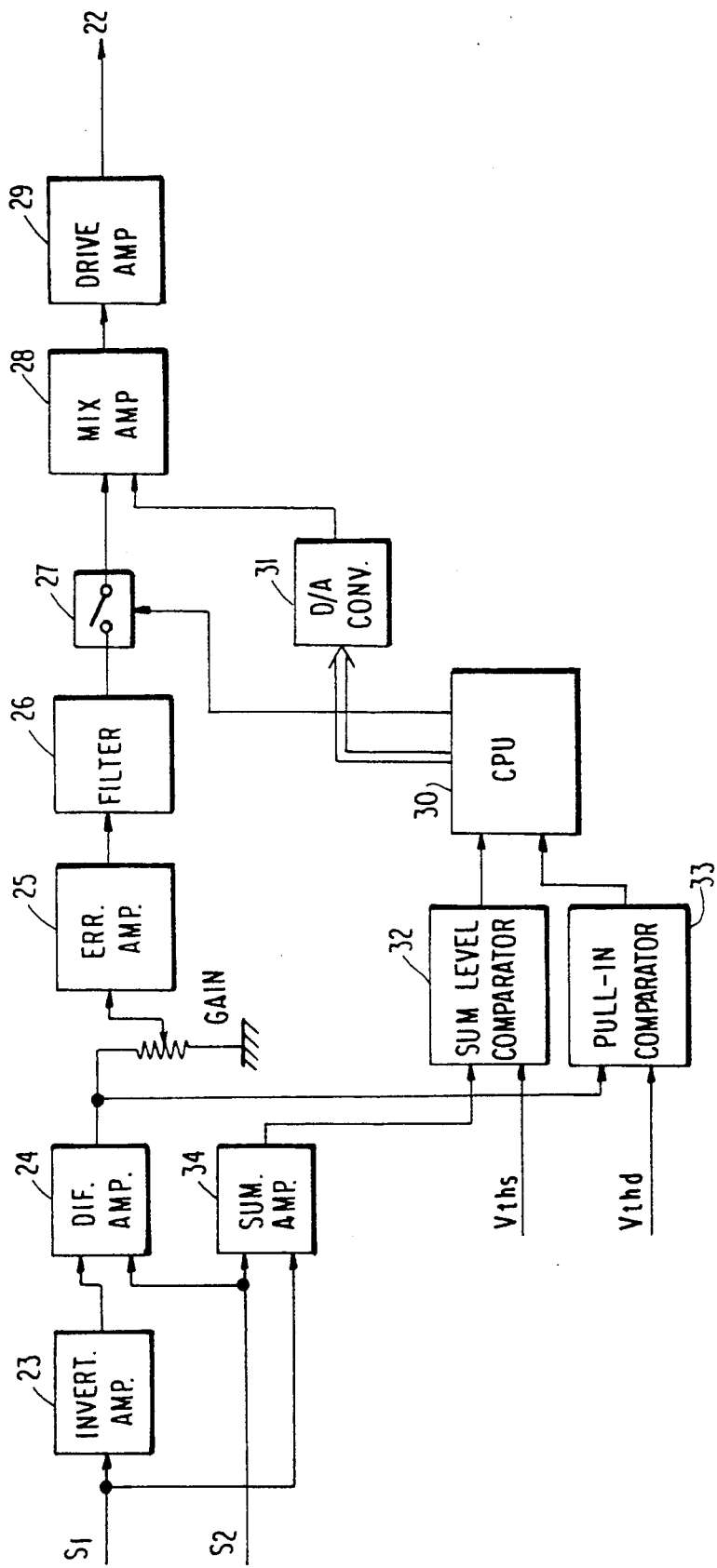
FIG. 2 is a block diagram schematically showing a conventional focus servo circuit included in the apparatus of FIG. 1.
Figure 5:
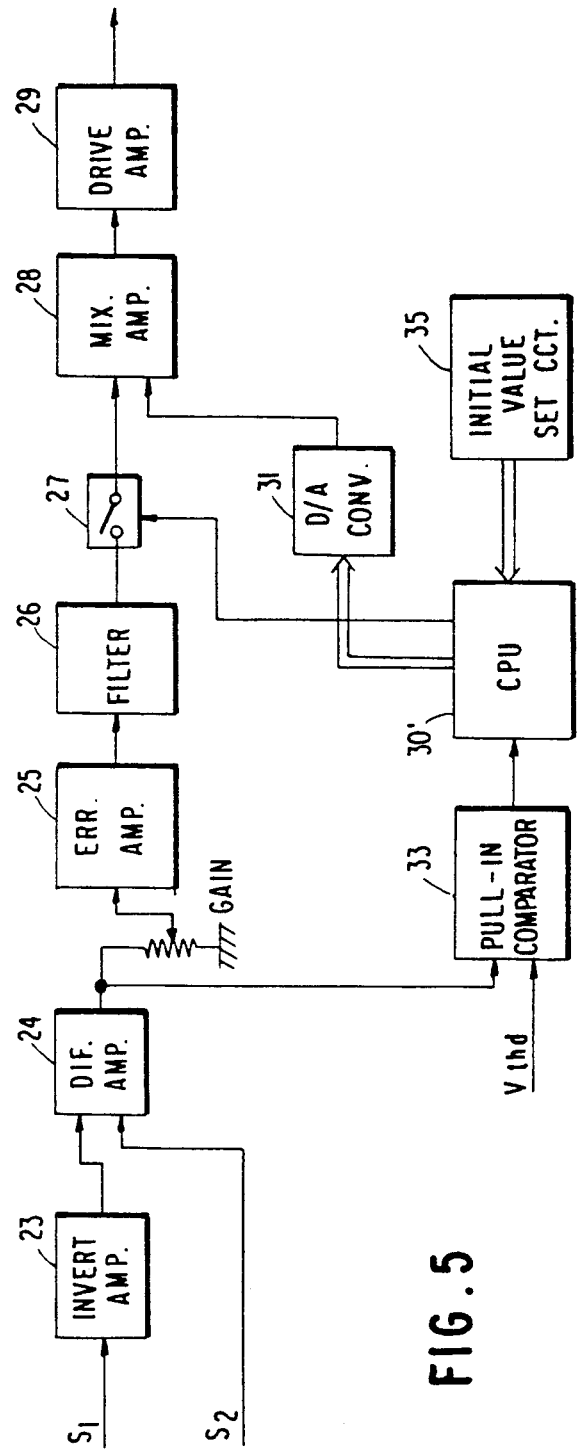
FIG. 5 is a block diagram schematically showing a focus servo circuit embodying the present invention.

Referring to FIG. 5, a focus servo circuit embodying the present invention is shown. In FIG. 5, the blocks functionally equivalent to those shown in FIG. 2 are designated by the same reference numerals, and redundant description will be avoided for simplicity. Briefly, the embodiment uses a knife edge method in detecting a focus error. The well-known knife edge method is such that a knife edge is disposed on an optical converging reflection path from a magneto-optical disk, and a displacement of a beam spot image on a light-sensitive element is detected to determine the focus error.

By comparing FIG. 5 with FIG. 2, it will be seen that the embodiment does not have the sum amplifier 34 and sum level comparator 32 and, instead, it has an initial value setting circuit 35. The initial value setting circuit 35 sets the position $L_P(<L_S)$ of the objective lens 13 at the beginning of the focusing operation.

Figure 3A:
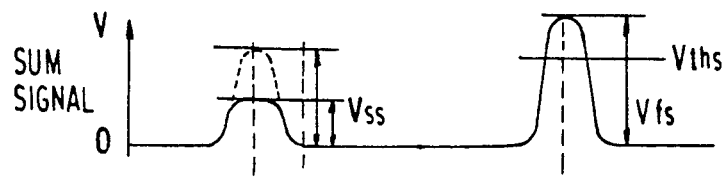
FIGS. 3(a), 3(b), 3(c) and 3(d) show respectively a sum signal, a difference signal, a lens position and a lens drive current which are representative of a focusing operation.
Figure 3B:
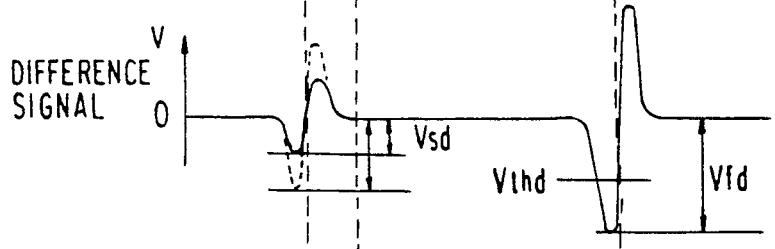
Figure 6:
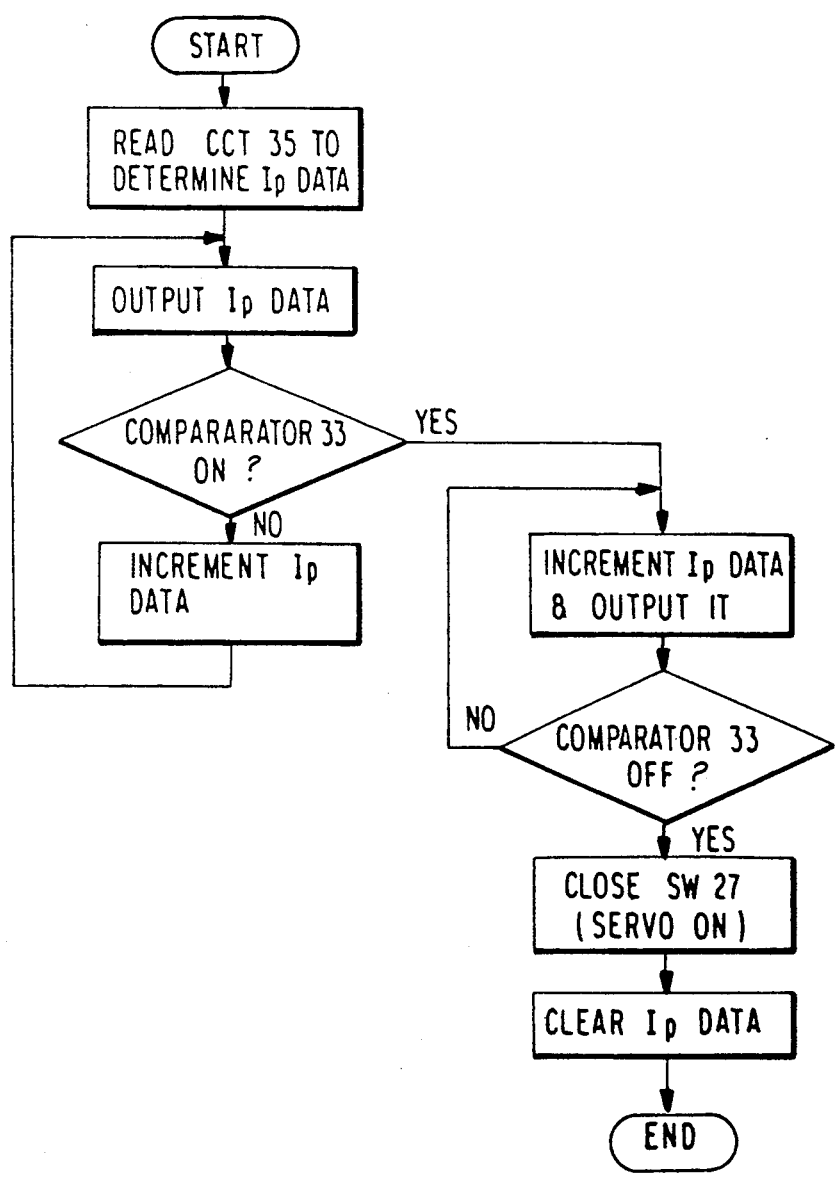
FIG. 6 is a flowchart demonstrating a specific focus servo pull-in operation particular to the embodiment.

In operation, the servo error output is zero when the power source is turned on. At this instant, the lens drive current I is zero, and the objective lens 13 is located at a point Q, FIG. 3(c). Then, the lens drive current $I_p$ is applied on the basis of data having been set by the initial value setting circuit 35. A CPU 30' outputs updating data such that the objective lens 13 is once moved away from the point Q to a point P and then sequentially moved toward a position $L_R$ where the laser beam is focused on the recording film. As a result, the servo circuit 21 outputs a drive current I corresponding to the updating data from the CPU 30'. As the objective lens 13 approaches the disk 1 on the basis of the drive current I, FIG. 3(d), a difference signal shown at the right-hand side of FIG. 3(b) is produced. Comparing the difference signal with the threshold value Vthd, the pull in comparator 33 produces an ON output when the amplitude of the difference signal exceeds Vthd. Despite the ON output of the comparator 33, the CPU 30' continuously transfers the updating data to the D/A converter 31. As a result, at the instant when the amplitude of the difference signal becomes smaller than Vthd, the comparator produces an OFF output. In response to the OFF output, the CPU 30' closes the switch 27 to start on a servo operation and, at the same time, clears the data to be fed to the D/A converter 31, i.e., reduces it to zero. Once the servo is activated, the recording or reproducing operation is continued with the laser beam surely focused onto the recording film despite any undulation on the disk surface. The procedure described above is shown in a flowchart in FIG. 6.

In a recording and reproducing apparatus implemented with the present invention, the distance $L_S$ is about 4 millimeters while the distance $L_R$ on the focus of the beam on the recording film is about 2.8 millimeters. While the lens position may be adjusted to less than $L_S$ at an assembly stage, it sometimes occurs that the distance L between the objective lens 13 and the disk fails to satisfy the relation $L < L_S$ in the event of assembly. Then, in a conventional apparatus, the focus is apt to coincide with the surface of a disk. By contrast, the present invention can set an initial value into the initial value setting circuit 35, which sets up a desired relation $L < L_S$ in spite of a resultant condition of an assembled apparatus, eliminating the drawback particular to the conventional apparatus. This enhances the margins regarding the accuracy of parts and the accuracy of assembly.

Figure 3C:
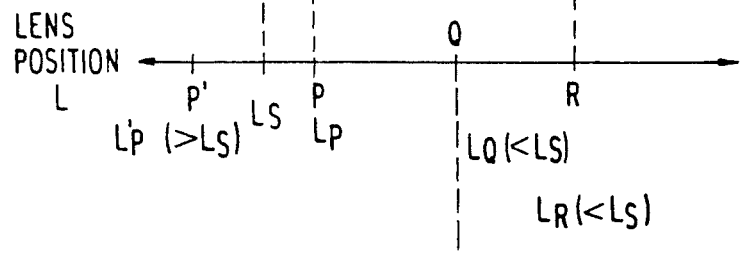
Figure 3D:
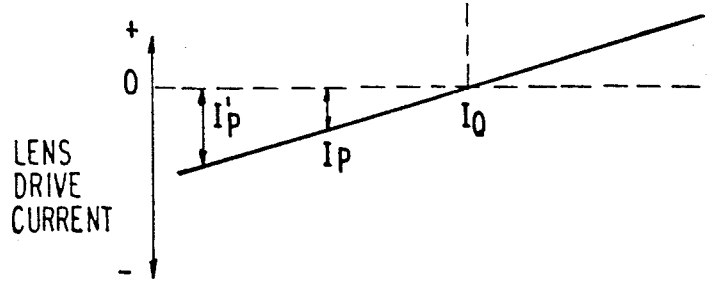
Figure 4A:
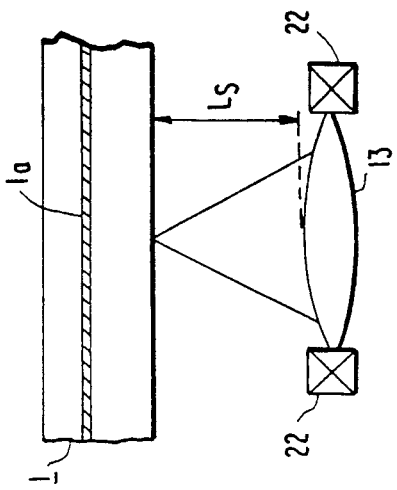
FIGS. 4(a) and 4(b) each shows a specific relationship between a disk and an objective lens.
Figure 4B:
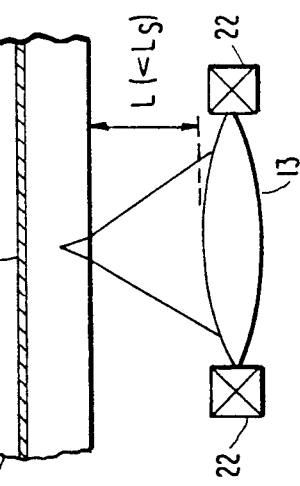

Further, in accordance with the present invention, since the objective lens does not move away from the disk surface beyond the point P, FIG. 3(c), the amplitude of the difference signal changes only in the vicinity of the position R where the laser beam is focused on the recording film. Therefore, it is not necessary to discriminate and exclude the focus on the disk surface by the sum signal. More specifically, servo can be surely applied only if the difference signal is monitored.

In summary, it will be seen that the present invention provides a focus servo circuit which insures stable recording/playback of a disk even when the surface of the disk and a recording film disposed in the disk are little different in reflectivity from each other.

Various modifications will become possible for those skilled in the art after receiving the teachings of the present disclosure without departing from the scope thereof.

What is claimed is:

1. An apparatus for recording/reproducing data in/-form an optical disk with a laser beam, comprising:
    an optical head for emitting a laser beam toward the recording surface of the disk, said optical head including an objective lens; and
    focus control means for effecting focus control which controls the distance of said objective lens from the disk to focus said laser beam on an inner recording film of the disk even when the reflective properties of the surface of the disk and the inner recording film are substantially identical;
    said focus control means including:
    focus error detecting means;
    focus servo means responsive to a focus error delivered from said focus error detecting means for driving said optical head in a direction for reducing said focus error to zero;
    initial value setting means for setting an initial value of said distance of said objective lens from said disk, wherein said initial value is predetermined such that said objective lens has an initial position between a position where the laser beam from said objective lens is focused on the surface of said disk and a position where said laser beam is focused on a recording film disposed in said disk; and
    advancing means for successively advancing said lens from said initial position towards said disk until said lens is focused on the inner recording film.

2. An apparatus as claimed in claim 1, further comprising:
    means for ON/OFF controlling the operation of said focus servo means;
    decision means responsive to said focus error detecting means for determining that the laser beam has been focused;
    means for maintaining the servo operation in an OFF state at the beginning of an operation of said apparatus so as to sequentially move said objective lens from said initial value toward said disk; and
    means for turning the focus servo operation to an ON state in response to an output of said decision means.

3. An apparatus as claimed in claim 2, wherein said decision means comprises a comparator for comparing an output of said focus error detecting means with a predetermined threshold value.

4. An apparatus for optically reproducing data from a disk having a recording film therein by focusing a laser beam from an objective lens onto said recording film even when the reflective properties of the surface of said disk and said recording film are substantially identical, said apparatus being characterized in that said objective lens is always located at a distance short of a distance where said laser beam is focused on the surface of said disk when said apparatus operates, and said objective lens is moved toward said recording film of said disk from the location.

5. A method of focusing a laser beam onto an inner recording film of a disk even when the reflectivity properties of a surface of the disk and said inner recording film of the disk are substantially identical, including steps of:
    initially setting a distance from an objective lens, through which said laser beam passes on its way to said disk, to said disk, said initially set distance being less than the distance between the lens and the disk when the lens is focused on the surface of the disk; and
    sequentially decreasing said initially set distance until said laser beam is focused on a recording film disposed in said disk.

* * * * *